Figure 1:
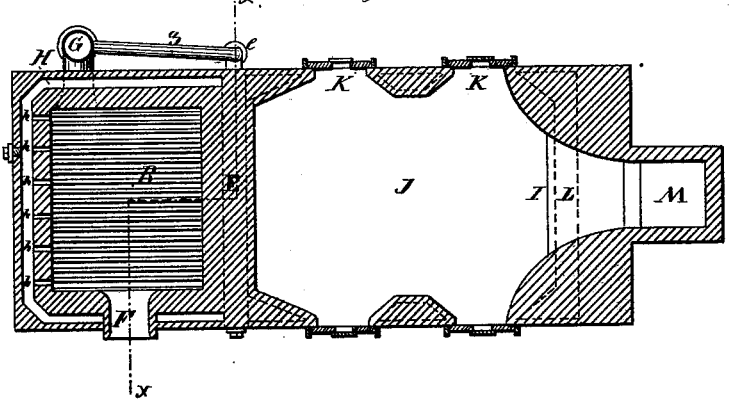

H. C. KRIETE.
Reverberating Furnace.

No. 218,543.       Patented Aug. 12, 1879.

Witnesses.

Inventor.
Henry C. Kriete
By Wm H Lotz
Attorney

UNITED STATES PATENT OFFICE.

HENRY C. KRIETE, OF CHICAGO, ILLINOIS.

IMPROVEMENT IN REVERBERATING FURNACES.

Specification forming part of Letters Patent No. 218,543, dated August 12, 1879; application filed March 22, 1879.

*To all whom it may concern:*

Be it known that I, HENRY C. KRIETE, of Chicago, in the county of Cook and State of Illinois, have invented a new and useful Improvement in Reverberatory Furnaces; and that the following is a full, clear, and exact description of the invention, which will enable others skilled in the art to which it appertains to make and use the same, reference being had to the accompanying drawings, which form part of this specification.

The nature of my invention relates to the construction of reverberatory or puddling furnaces, in which pig metal is converted into wrought-iron.

In such furnaces, in which the contact between the metal and the solid fuel is avoided and the iron is melted and boiled by a strong blast of heated air and gases from the fire-chamber, the tremendous heat to be raised would be destructive to the inner walls of the fire-chamber without some device for constantly cooling the same to a certain degree, for which purpose heretofore water-circulating pipes or chambers have been frequently applied; and with the puddling process, whereby the iron has to be constantly stirred and gathered with a rabble for exposing every particle of it to the action of the blast from the fire to decarbonize the same, it is of the utmost necessity to provide for a perfect combustion of the carbureted hydrogen volatilizing from the fuel by supplying not only a sufficient quantity of oxygen to the fire above the grate in addition to such required for the incandescent coal from under the grate for obtaining carbonic-acid gas as the product of a perfect combustion, but it is even essential to inject a surplus of oxygen over that required for consuming the gases, which is to combine with the carbon in the iron, to facilitate the converting process. But only about one-fifth of the volume of atmospheric air being oxygen, and hydrocarbon gas requiring twice its volume of oxygen for forming carbonic-acid gas, hence ten volumes of atmospheric air will be necessary for each volume of the generated gases, besides the air required for furnishing the oxygen to reduce the carbon in the iron. Such a large quantity of atmospheric air, if injected into the fire-chamber with its natural temperature, would not readily mix with the gases, and would considerably reduce the heat in the furnace, and thereby it would detain the converting process, to obviate which it is necessary that the air should be heated to a high degree before it is allowed to enter the fire-chamber of the furnace.

The object of my invention is to make useful the otherwise destructive heat in the furnace-walls for heating the air before admitting the same into the furnace; and my invention consists in the combination, with the iron-chamber, fire-chamber, and ash-pit of an iron-puddling furnace, of a blast-pipe for supplying an air-blast to the ash-pit, a branch pipe connecting said blast-pipe with a flue in the hollow front bridge-wall, an air-flue, formed by making hollow the front and side walls of the fire-chamber, connecting with the hollow bridge-wall, and air-openings in the front wall of the fire-chamber above the grate, connecting the flue in the hollow walls with the interior of the fire-chamber, so as to force jets of heated air into the products of combustion as they rise from the fuel, the whole being for the purpose of aiding to produce the perfect combustion of the fuel, as fully hereinafter explained.

Figure 2:
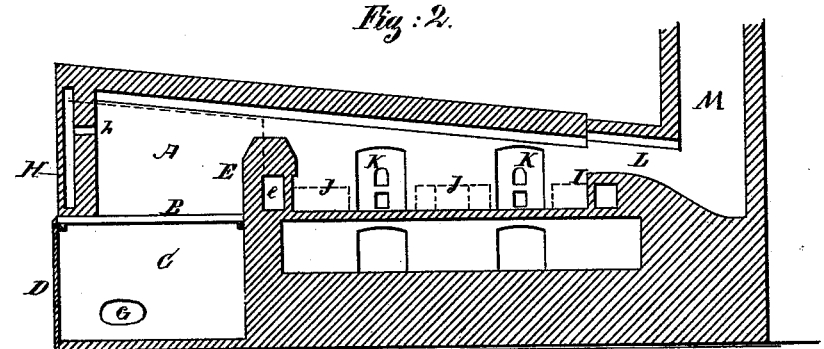
Figure 3:
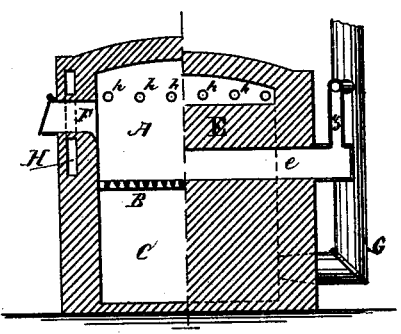

In the drawings, Figure 1 represents a sectional plan of the furnace; Fig. 2, a longitudinal vertical section of the same, and Fig. 3 a vertical transverse section on line *x x* in Fig. 1.

Like letters in the several figures of the drawings designate like parts.

A is the fire-chamber; B, the grate-bars; C, the ash-pit; D, the ash-pit door; E, the bridge-wall, and F the fuel-door.

An iron flue, *e*, built into the bridge-wall, with one end projecting through the side wall of the furnace, and with its ends closed, is connected by a branch pipe, *g*, with the pipe G, which conducts a current of air from a blower into the ash-pit, and by said branch pipe *g* into the bridge-wall flue, and into the wall surrounding the fire-chamber A.

On three sides is placed an iron jacket-flue, H, composed of closely-joining sectional chambers, and communicating with the ends of flue *e* in the bridge-wall, so that the air forced into flue e will circulate through jacket H, to be injected into the fire-chamber A through a series of hole, h.

The pipes G and g are provided with suitable valves for regulating or entirely shutting off the air-supply to the fire from above or below the grate.

As will be seen, the air in circulating through these flues serves the double purpose of preventing the fire-chamber walls and bridge-wall from becoming overheated by continuously absorbing a portion of the heat therein, and of utilizing the same for producing a hot-blast to the fire.

I is the rear bridge-wall, arranged with a flue, which is open at both ends for a free circulation of the outside atmosphere. J is the iron-chamber, the bottom of which is formed of iron plates, covered with refractory slags and oxide of iron, and accessory to a free circulation of atmospheric air from below in the usual manner. K K are the working-doors or stock-holes, two on each side of the furnace, through which the iron-chamber is charged and the blooms are taken out, and which are provided with the customary doors, to be raised by levers.

The area of the iron-chamber, by the greater working capacity of the furnace, with the provision for a hot-blast, as above described, being increased, the stirring and agitating of the metal cannot be accomplished through two opposite doors only, as in the puddling-furnaces of the old construction; and therefore I have found it advantageous to double the number of doors, so as to be proportional therewith, for a larger number of men to have access for the operation of puddling.

L is the neck, carrying off the gaseous products of combustion to the stack M.

The side walls of the iron-chamber are built hollow, with openings in the exterior walls for a free circulation of air. The top of the furnace is arched over, and the side walls are braced by iron plates and cross-bolts, all of which are constructed in the usual manner.

While this furnace is being recharged with pig-iron the air-blast to the bridge-wall and jacket-flues is shut off, when the fire-chamber-surrounding-walls will become highly heated, which heat, thus accumulating, will assist to melt the metal with great rapidity by increasing the heat of the blast, first circulating through the flues again, to a very high degree, and will thereby shorten the time required for the converting process.

A furnace of my above construction can be charged with twenty-two hundred pounds of iron, while in furnaces of the old system a usual charge only has been about ten hundred and fifty pounds; and while heretofore the puddling of a ton of iron required twenty-three hundred pounds of the best bituminous coal, I accomplish the same object now with fifteen hundred pounds of an inferior coal, and in less time, thereby being able to convert more than twice the amount of iron in my furnace per day, with a saving of cost in the manufacture of about three dollars per ton of wrought-iron.

I am aware that it is old to supply furnaces with an air-blast both above and below the fuel; and that the walls of furnaces have been made hollow and provided with flues in various parts, through which such air passes to heat the same; and that air has been heated for supporting combustion in furnaces by passing it through a hollow bridge-wall, and has also been heated by passing it through the hollow front wall, and also through hollow side walls, hollow roofs, and hollow beds; and I do not claim any of these contrivances, broadly, but only my particular combination and construction of parts.

What I claim as new, and desire to secure by Letters Patent, is—

The iron-chamber J, fire-chamber A, and ash-pit C of an iron-puddling furnace, in combination with the blast-pipe G, supplying an air-blast to the ash-pit, the branch pipe g, connecting the said blast-pipe with the flue e in the hollow front bridge-wall, the hollow front and side walls of the fire-chamber connecting with said flue e and forming the flue H, and the openings h in the front wall of the fire-chamber above the grate, connecting the flue H with the fire-chamber, so as to force jets of heated air into the products of combustion as they rise from the fuel, the whole being for the purpose of aiding to produce the perfect combustion of the fuel, constructed and arranged substantially as described and shown.

HENRY C. KRIETE.

Witnesses:
EMIL H. FROMMANN,
ERNST JEBSEN.